(12) United States Patent　　(10) Patent No.: US 9,215,949 B1
Cloutier et al.　　(45) Date of Patent: Dec. 22, 2015

(54) MODULAR GRIDDLE AND GRILL FRAME WITH INSERTS

(71) Applicant: Magellan Group, Ltd., Blaine, WA (US)

(72) Inventors: Andre Dean Cloutier, Blaine, WA (US);
Edwin Cheong, Blaine, WA (US);
Adriana Collins, Blaine, WA (US);
Marie Thornton, Blaine, WA (US);
Debra Lynne Sasken-Duff, Blaine, WA (US)

(73) Assignee: Magellan Group Ltd., Blaine, WA (US)

( * ) Notice: Subject to any disclaimer, the term of this patent is extended or adjusted under 35 U.S.C. 154(b) by 0 days.

(21) Appl. No.: 13/653,897

(22) Filed: Oct. 17, 2012

(51) Int. Cl.
*A47J 37/10* (2006.01)
*A47J 37/07* (2006.01)
*A47J 37/06* (2006.01)

(52) U.S. Cl.
CPC .......... *A47J 37/0704* (2013.01); *A47J 37/0694* (2013.01)

(58) Field of Classification Search
CPC .................................................... A47J 37/0694
USPC ................... 99/340, 357, 422, 426, 449, 450
See application file for complete search history.

(56) References Cited

U.S. PATENT DOCUMENTS

| 33,444 | A | * | 10/1861 | Miller | 99/450 |
|---|---|---|---|---|---|
| 913,148 | A | * | 2/1909 | McNulty | 126/41 R |
| 1,630,787 | A | * | 5/1927 | Cullen | 99/416 |
| 1,708,499 | A | * | 4/1929 | Filbey | 99/377 |
| 1,954,235 | A | * | 4/1934 | Becker et al. | 99/339 |
| 1,957,133 | A | * | 5/1934 | Davis | 99/424 |
| 1,968,950 | A | * | 8/1934 | Maigret | 99/347 |
| 2,014,089 | A | * | 9/1935 | Sabini | 99/336 |
| RE20,288 | E | * | 3/1937 | Schroeder | 99/425 |
| 2,454,054 | A | * | 11/1948 | Gibb | 99/449 |
| 2,515,617 | A | * | 7/1950 | Tilford | 126/390.1 |
| 2,711,685 | A | * | 6/1955 | Daugherty | 99/410 |
| 2,787,891 | A | * | 4/1957 | Hengehold | 62/329 |
| 2,848,938 | A | * | 8/1958 | Klein | 99/355 |
| 2,875,683 | A | * | 3/1959 | Burns | 99/425 |
| 3,199,438 | A | * | 8/1965 | Myler et al. | 99/421 R |
| 3,717,083 | A | * | 2/1973 | Karapetian | 99/450 |
| 4,291,616 | A | * | 9/1981 | Taylor | 99/446 |
| D270,703 | S | * | 9/1983 | El-Hag et al. | D7/357 |
| 4,607,608 | A | * | 8/1986 | Allred et al. | 126/30 |
| 4,679,543 | A | * | 7/1987 | Waltman et al. | 126/25 R |
| 4,856,423 | A | * | 8/1989 | Burns | 99/421 H |

(Continued)

*Primary Examiner* — Dana Ross
*Assistant Examiner* — Jimmy Chou
(74) *Attorney, Agent, or Firm* — Dwayne E. Rogge; Schacht Law Office, Inc.

(57) ABSTRACT

Disclosed herein is a combination griddle and modular grilling frame comprising in one example a thermally conductive frame having a longitudinal dimension, a transverse dimension, and a lowermost portion forming a perimeter foot. The grilling frame may also provide a transverse divider extending between opposing sides of the perimeter foot. The transverse divider in one example having: a first longitudinal side and a longitudinally opposing second longitudinal side. Also provided is a thermally conductive grilling surface extending between the first longitudinal side of the transverse divider and the portion of the perimeter foot facing the first longitudinal side of the transverse divider. Generally, the area bounded by the second longitudinal perimeter foot and the portion of the perimeter foot facing the second longitudinal side is substantially unobstructed and comprises a surface defining an insert shelf for fitting of a grilling surface such as a perforated plate or mesh panel.

8 Claims, 15 Drawing Sheets

(56) References Cited

U.S. PATENT DOCUMENTS

| | | | | |
|---|---|---|---|---|
| 4,870,233 | A * | 9/1989 | McDonald et al. | 219/730 |
| 4,941,401 | A * | 7/1990 | Sarnoff et al. | 99/446 |
| 5,211,105 | A * | 5/1993 | Liu | 99/446 |
| 5,440,973 | A * | 8/1995 | Welhouse | 99/425 |
| 5,605,143 | A * | 2/1997 | Hebert et al. | 126/41 R |
| 5,713,344 | A * | 2/1998 | Gilbert | 126/29 |
| 5,870,946 | A * | 2/1999 | Dudley | 99/426 |
| D408,222 | S * | 4/1999 | Carter | D7/541 |
| 5,891,498 | A * | 4/1999 | Boehler | 426/314 |
| 5,988,045 | A * | 11/1999 | Housley | 99/339 |
| 5,992,306 | A * | 11/1999 | Chiang | 99/411 |
| 5,992,308 | A * | 11/1999 | Kroscher et al. | 99/422 |
| 6,035,766 | A * | 3/2000 | Schirmer | 99/403 |
| 6,176,175 | B1 * | 1/2001 | Moreth | 99/408 |
| 6,188,046 | B1 * | 2/2001 | Barrow | 219/433 |
| 6,259,068 | B1 * | 7/2001 | Barrow | 219/432 |
| 6,279,469 | B1 * | 8/2001 | Bailey | 99/450 |
| 6,373,031 | B1 * | 4/2002 | Barrow | 219/432 |
| 6,386,192 | B1 * | 5/2002 | Weber | 126/30 |
| 6,415,564 | B1 * | 7/2002 | Beer | 52/204.61 |
| 6,463,844 | B1 * | 10/2002 | Wang et al. | 99/426 |
| 6,546,850 | B1 * | 4/2003 | Akiyama-Warren | 99/427 |
| 6,732,636 | B1 * | 5/2004 | Germano | 99/411 |
| 6,818,868 | B2 * | 11/2004 | Grohs | 219/450.1 |
| 7,188,617 | B1 * | 3/2007 | O'Blenes | 126/25 R |
| 7,288,745 | B2 * | 10/2007 | Colonna | 219/439 |
| 7,383,963 | B2 * | 6/2008 | Svabek et al. | 220/485 |
| 7,415,922 | B2 * | 8/2008 | Cheng | 99/425 |
| D577,946 | S * | 10/2008 | Carroll | D7/336 |
| 7,775,156 | B2 * | 8/2010 | Sus et al. | 99/410 |
| 7,971,522 | B2 * | 7/2011 | Sarnoff | 99/400 |
| 8,025,175 | B2 * | 9/2011 | Coyne et al. | 220/573.1 |
| D657,192 | S * | 4/2012 | Trussell | D7/408 |
| 8,302,528 | B2 * | 11/2012 | Pawlick et al. | 99/448 |
| 2002/0023548 | A1 * | 2/2002 | Almeida | 99/450 |
| 2002/0096056 | A1 * | 7/2002 | Hopkins | 99/422 |
| 2003/0072860 | A1 * | 4/2003 | Reed | 426/512 |
| 2005/0204931 | A1 * | 9/2005 | Cheng | 99/422 |
| 2006/0027106 | A1 * | 2/2006 | Craig et al. | 99/448 |
| 2006/0150827 | A1 * | 7/2006 | Bruno et al. | 99/450 |
| 2007/0084859 | A1 * | 4/2007 | Chen | 219/725 |
| 2007/0125357 | A1 * | 6/2007 | Johnston | 126/41 R |
| 2008/0105137 | A1 * | 5/2008 | Genslak et al. | 99/350 |
| 2009/0078125 | A1 * | 3/2009 | Pawlick et al. | 99/448 |
| 2009/0173332 | A1 * | 7/2009 | Lott | 126/153 |
| 2009/0229477 | A1 * | 9/2009 | Sarnoff | 99/450 |
| 2009/0250473 | A1 * | 10/2009 | Bois et al. | 220/573.1 |
| 2009/0311393 | A1 * | 12/2009 | Estess et al. | 426/312 |
| 2010/0313769 | A1 * | 12/2010 | Henry et al. | 99/427 |
| 2011/0000380 | A1 * | 1/2011 | Jamison | 99/417 |
| 2011/0011388 | A1 * | 1/2011 | Johnston | 126/25 R |
| 2011/0081471 | A1 * | 4/2011 | McLemore et al. | 426/523 |
| 2011/0088566 | A1 * | 4/2011 | Doxie | 99/426 |
| 2011/0108556 | A1 * | 5/2011 | Levie | 220/573.1 |
| 2011/0132347 | A1 * | 6/2011 | Kim | 126/25 R |
| 2012/0204731 | A1 * | 8/2012 | Yu | 99/393 |
| 2013/0029021 | A1 * | 1/2013 | Ketter et al. | 426/438 |

* cited by examiner

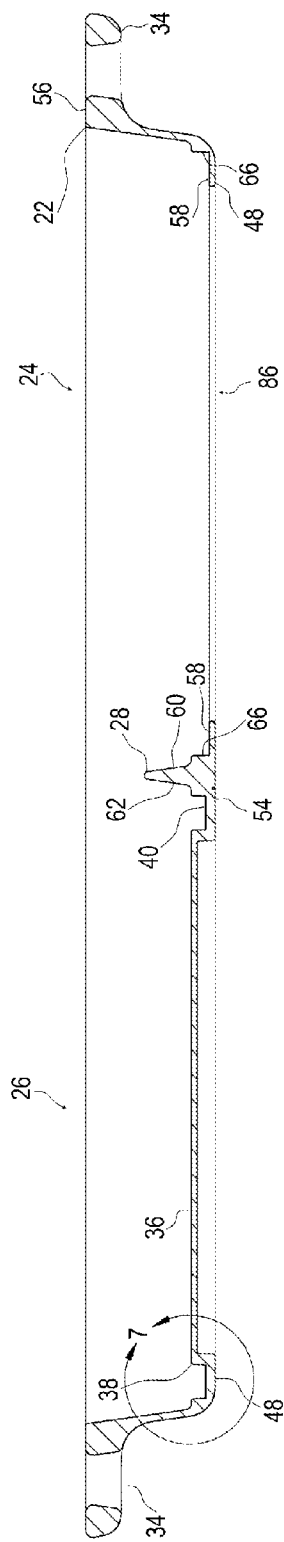
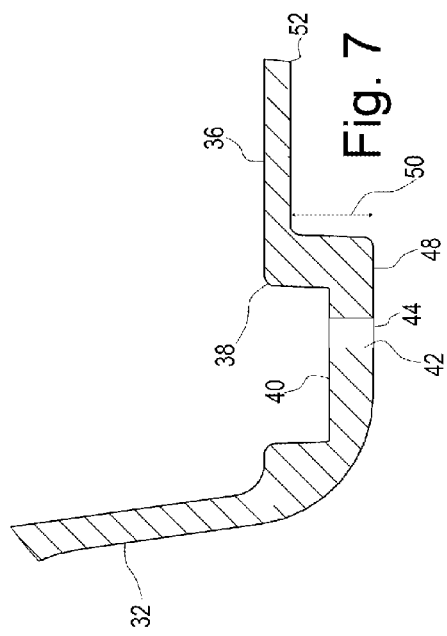
Fig. 6
Fig. 7

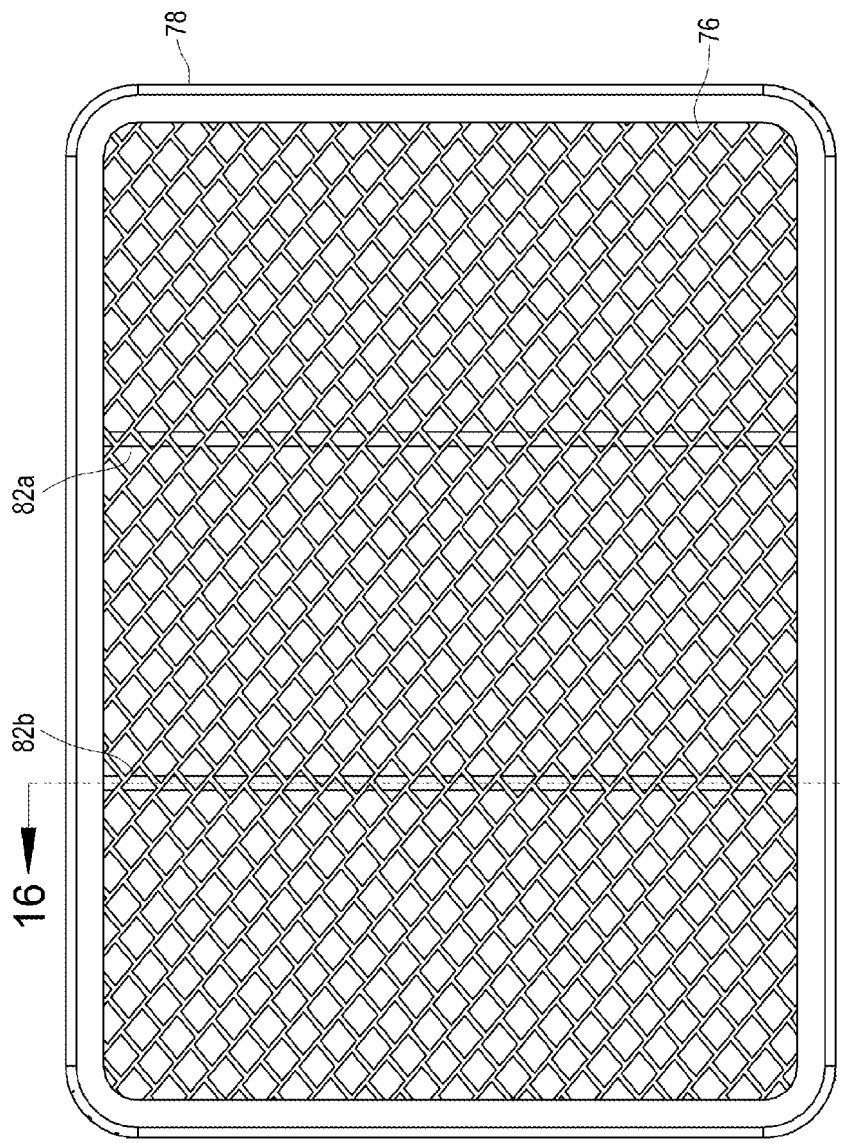
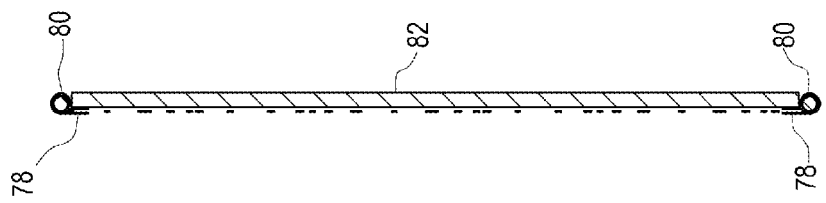

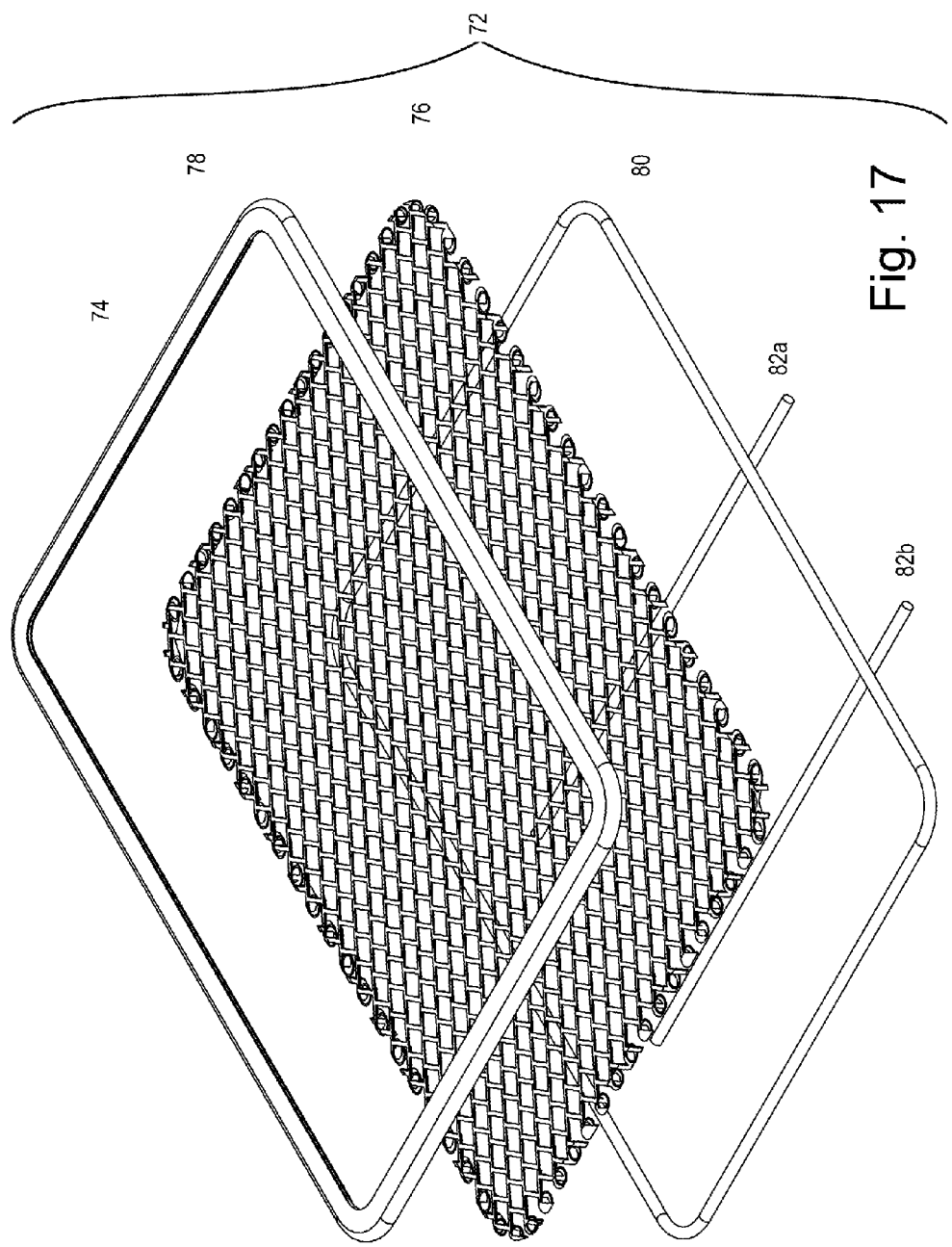

MODULAR GRIDDLE AND GRILL FRAME WITH INSERTS

BACKGROUND OF THE DISCLOSURE

Field of the Disclosure

This disclosure relates to the field of cookware for frying and/or grilling of food on a heat source such as a BBQ grill.

SUMMARY OF THE DISCLOSURE

Disclosed herein is a combination griddle and grilling frame comprising in one example a thermally conductive frame having a longitudinal dimension, a transverse dimension, and a lowermost portion forming a perimeter foot. The grilling frame may also provide a transverse divider extending between opposing sides of the perimeter foot. The transverse divider in one example having a first longitudinal side and a longitudinally opposing second longitudinal side. Also provided is a thermally conductive grilling surface extending between the first longitudinal side of the transverse divider and the portion of the perimeter foot facing the first longitudinal side of the transverse divider. Generally, the area bounded by the second longitudinal perimeter foot and the portion of the perimeter foot facing the second longitudinal side is substantially unobstructed and comprises a surface defining an insert shelf for fitting of a grilling surface such as a perforated plate or mesh panel.

The combination griddle and grilling frame as recited above further comprising a perforated plate fitted within and removably resting upon the insert shelf.

The combination griddle and grilling frame may further comprise a mesh insert fitted within and removably resting upon the insert shelf.

The mesh insert may also comprise an upper grill perimeter frame; a heat resistant mesh extending across and in contact with the upper grill frame; and a lower grill perimeter frame attached to the upper grill frame and in contact with the perimeter of the heat resistant mesh.

The combination griddle and grilling frame as recited above may further comprise at least one cross support vertically below the heat resistant mesh. The cross support in contact with a lower surface of the heat resistant mesh, and attached to the lower grill perimeter frame.

BRIEF DESCRIPTION OF THE DRAWINGS

FIG. 6 is a cutaway view taken along line 6-6 of FIG. 2.

FIG. 7 is a detail view of the region 7 of FIG. 6.

FIG. 15 is an top view of the mesh insert.

FIG. 16 is a side cutaway view of the mesh insert taken along line 16-16 of FIG. 15.

FIG. 17 is an exploded view of the elements comprising the mesh insert.

DESCRIPTION OF THE PREFERRED EMBODIMENTS

Figure 1:
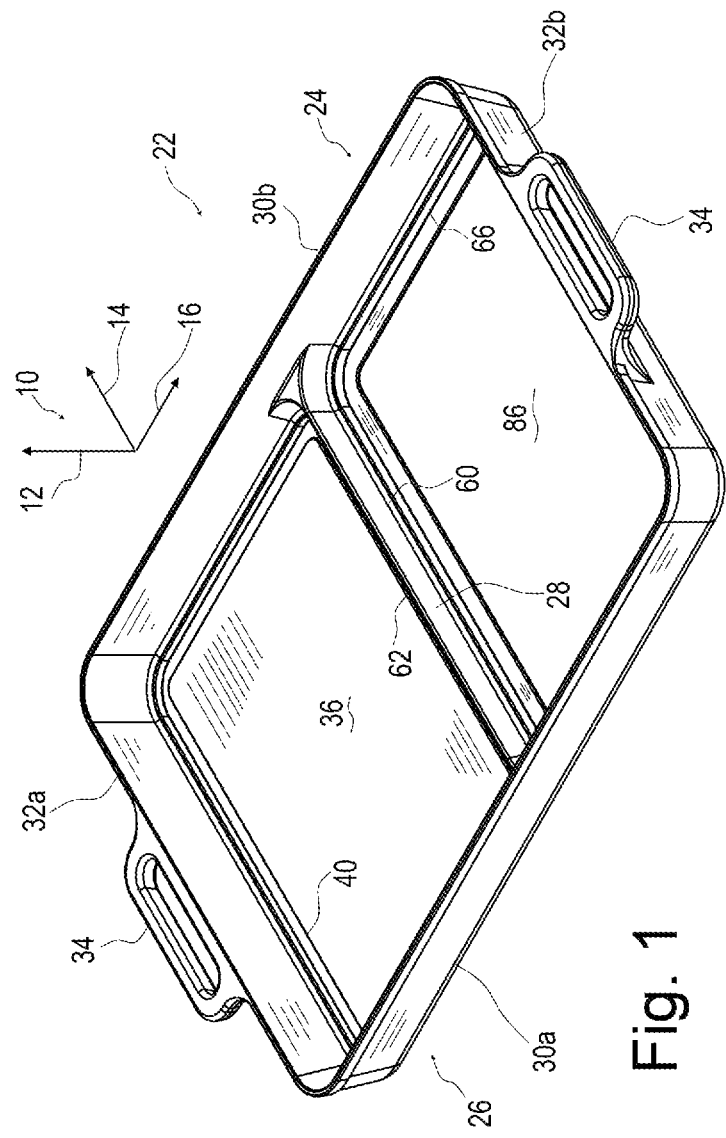
FIG. 1 is an isometric view of the disclosed device with the inserts shown separately for clarity of illustration.

Disclosed herein is a device to be used upon the cooking surface of a barbecue grill although it may possibly be used in an oven, over a campfire, stovetop or other heating source. Generally speaking, the modular griddle and grill frame with inserts comprises two separable components. The first component being a frame portion 22, the second being an insert to fit within a first side of the frame portion 22. This first longitudinal side defining a grill portion 24. In this example the opposing longitudinal side of the frame 22 comprises a griddle portion 26. In use, it can be very convenient to utilize the apparatus for cooking when it is desired to simultaneously or nearly simultaneously cook items on a griddle and on a grill. For instance when it is desired to fry onions on a griddle, and grill hamburgers or other meats on a grate, and then serve the fried onions on the surface of the meat. The term "grate" used herein to cover perforated, mesh, rail, and equivalent cooking surfaces.

Before continuing with the detailed description, an axes system 10 is disclosed. The axes system comprising a vertical axis 12, a transverse or lateral axis 14, and a longitudinal axis 16. These axes are intended for use in description and are not intended to limit the device to a particular orientation which may change, such as when the apparatus is not being used as a cooking utensil.

Looking to FIG. 1, the frame portion 22 can be easily seen comprising a grill portion 24 and a griddle portion 26. A transverse divider 28 may be provided to clearly separate the grill portion 24 from the griddle portion 26 so as to keep foodstuffs cooked on either side from prematurely combining. The transverse divider 28 has a first longitudinal side 60 adjacent the grill portion 24, and a second longitudinal side 62 adjacent the griddle portion 26. Additionally, this example of the frame portion 22 comprises sidewalls 30 and end walls 32. A plurality of handles 34 are also shown on opposing sides of the frame. These handles are very useful for repositioning the apparatus after cooking for example to move the cooked food from the heat source to a serving table while the food and the frame are still hot. Generally speaking, foodstuffs are cooked directly on a grilling surface such as the grate of a barbecue grill and then removed therefrom with a fork, spatula, tongs etc. onto a serving plate or similar apparatus. The serving plate is then transferred to the serving table. Normally, the food is placed on a cold serving plate which clearly reduces the temperature thereof. Such temperature reduction prior to serving is normally not desired. Thus, by providing cookware which can be cooked directly thereupon and then transferred directly to a serving table, the cookware retains the heat collected during cooking and reduces thermal losses during transportation. If thermally insulated handles or handle covers are not provided, a thermally insulating pot holder may be used to protect the cook and the serving table surface.

To enhance the thermal retention and thermal transmission aspects of the overall apparatus, the apparatus may be cast of iron, aluminum, heat transmitting glass, polymers, or other materials provided that sufficient rigidity and thermal transmission is provided. Clearly, it will be desired that in high heat applications, the material comprising the apparatus not be negatively affected by heat. To ease in manufacture and to provide a rigid and aesthetically pleasing apparatus, the entire frame portion 22 including the griddle portion 26 may be cast as a unitary structure. The term "unitary structure" herein defining an object which is substantially homogenous in the construction material and free from fasteners, welds, and other such attachment methods and apparatus.

Looking to the cross sectional view of FIG. 6, it can be seen how the griddle portion 26 comprises a substantially planar (flat and residing in a plane) grilling surface 36. Additionally, outward of the perimeter edge 38 may be provided a recess comprising a grease channel 40 between the grilling surface 36 and the end wall 32. The grease channel 40 may also be provided between the grilling surface 36 and the sidewalls 30 as well as between the grilling surface 36 and a second longitudinal side the transverse divider 28. In some applications, surfaces 42 defining drain holes 44 may be provided in the bottom of the grease channel 40 to allow grease, and other fluids to drain out of the grease channel 40. Where the apparatus may be used more exclusively on a stovetop for example, it may be desired to retain the fluids, and these drain holes 44 may not be provided.

FIG. 6 also quite clearly shows a perimeter foot 48 which encircles the apparatus such that the apparatus rests upon the perimeter foot 48 when it is placed on a planar or overall planar surface such as a flat tabletop, parallel surface bars or a grate of a barbecue grill etc. As can be seen in FIGS. 6 and 7, there may be provided a vertical offset 50 between the perimeter foot 48 and the lower surface 52 of the grilling surface 36. In one example, this vertical offset allows the grilling surface 36 to be cast in a relatively thin sheet while the structure of the perimeter foot 48 provides sufficient rigidity to the overall apparatus.

Looking to FIG. 6, it can be seen how in this embodiment, the transverse divider 28 extends vertically above a center foot 54.

Figure 4:
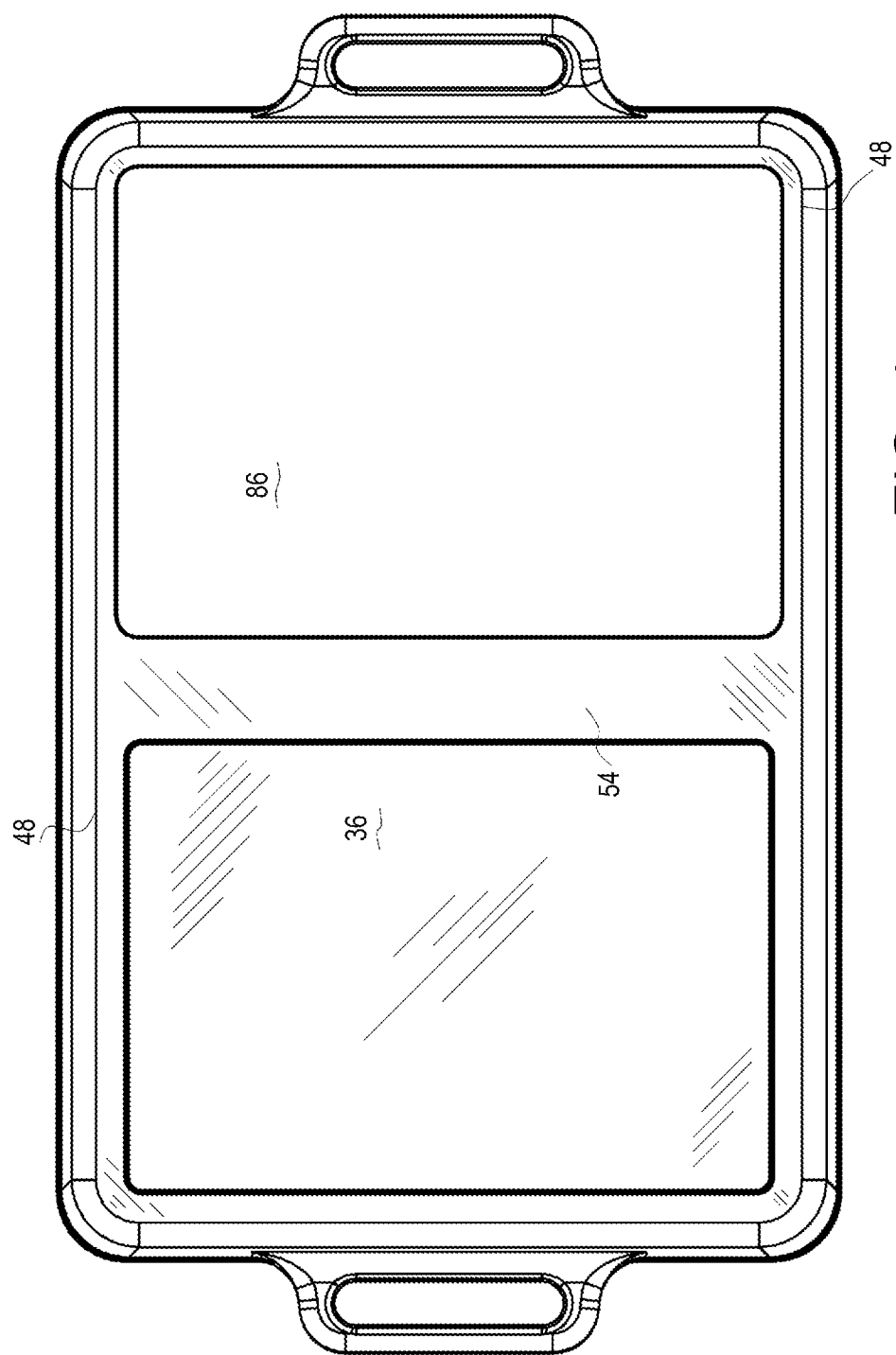
FIG. 4 is a bottom view thereof.
Figure 5:
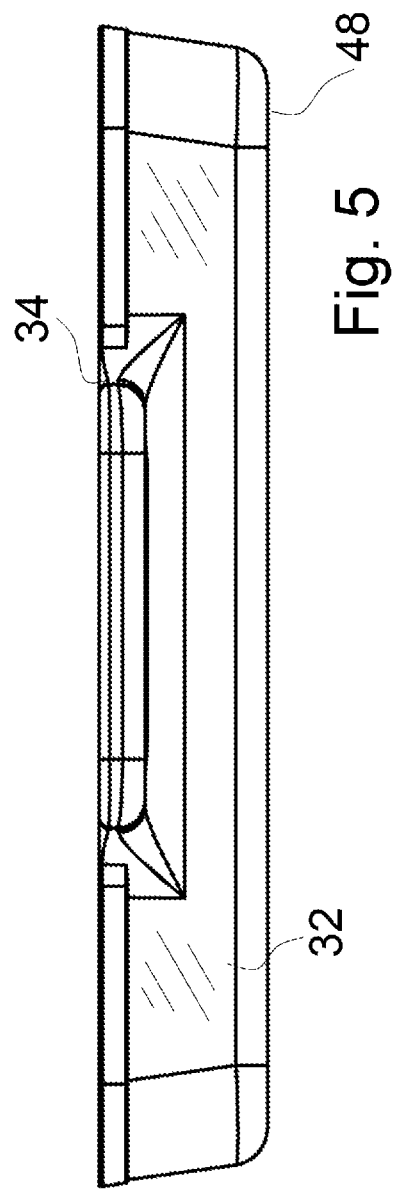
FIG. 5 is a side view thereof with the opposing side view being a mirror image thereof.

The perimeter foot 54 can also be easily seen in the bottom view of FIG. 4.

FIG. 6 also shows how in this embodiment, the transverse divider 28 extends vertically above the center foot 54 and the grease channel 40, but does not extend to the upper edge 56 of the frame portion 22. In other examples, the transverse divider may extend vertically to the upper edge 56 of the frame portion 22.

Figure 2:
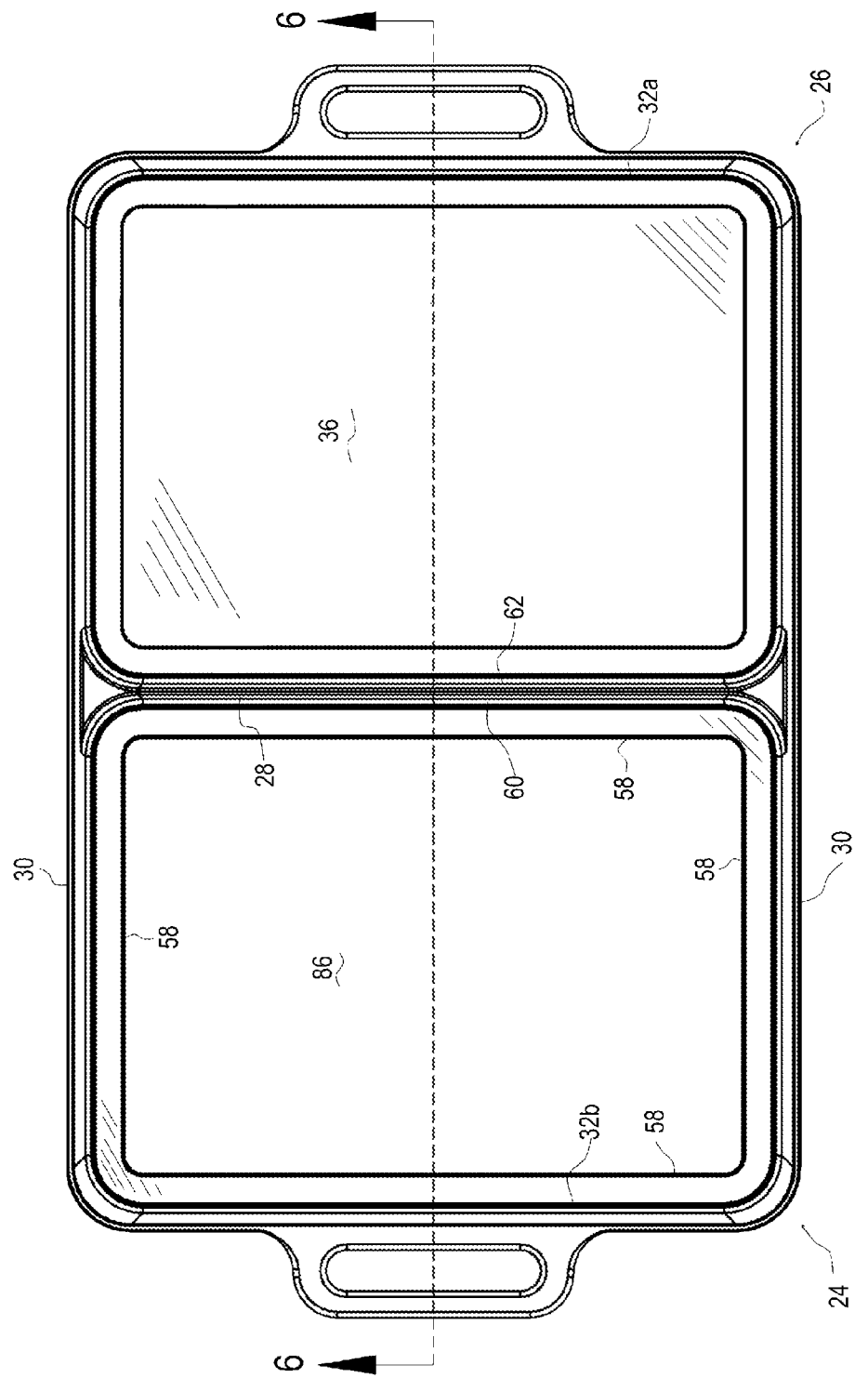
FIG. 2 is a top view thereof.
Figure 3:
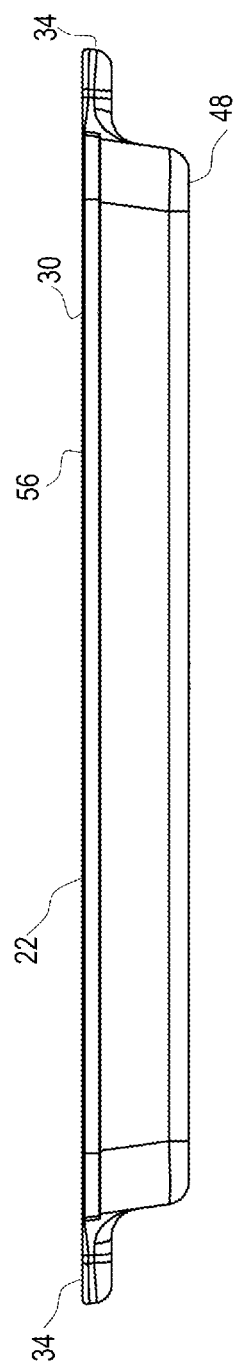
FIG. 3 is a front view thereof with the opposing rear view being a mirror image thereof.

FIG. 6 also shows an insert shelf 58 which extends inward from the transverse divider 28 toward the center or open region 86 of the grill portion 24. This example of the insert shelf 58 also extends from the first longitudinal side 60 of the transverse divider 28 and as can be seen in FIG. 2 extends inward towards the open region 86 from the end wall 32b. The insert shelf 58 may also or alternatively extend inward from the sidewalls 30.

A numbering system is used herein wherein a general element is disclosed and described with a numeric identifier and when substantially identical elements are provided, they may be distinguished with an alphabetic suffix. For example, the end walls are numbered 32 whereas the endwall nearest the grill portion is labeled 32b and the end wall nearest the griddle portion 26 is labeled 32a.

Figure 8:
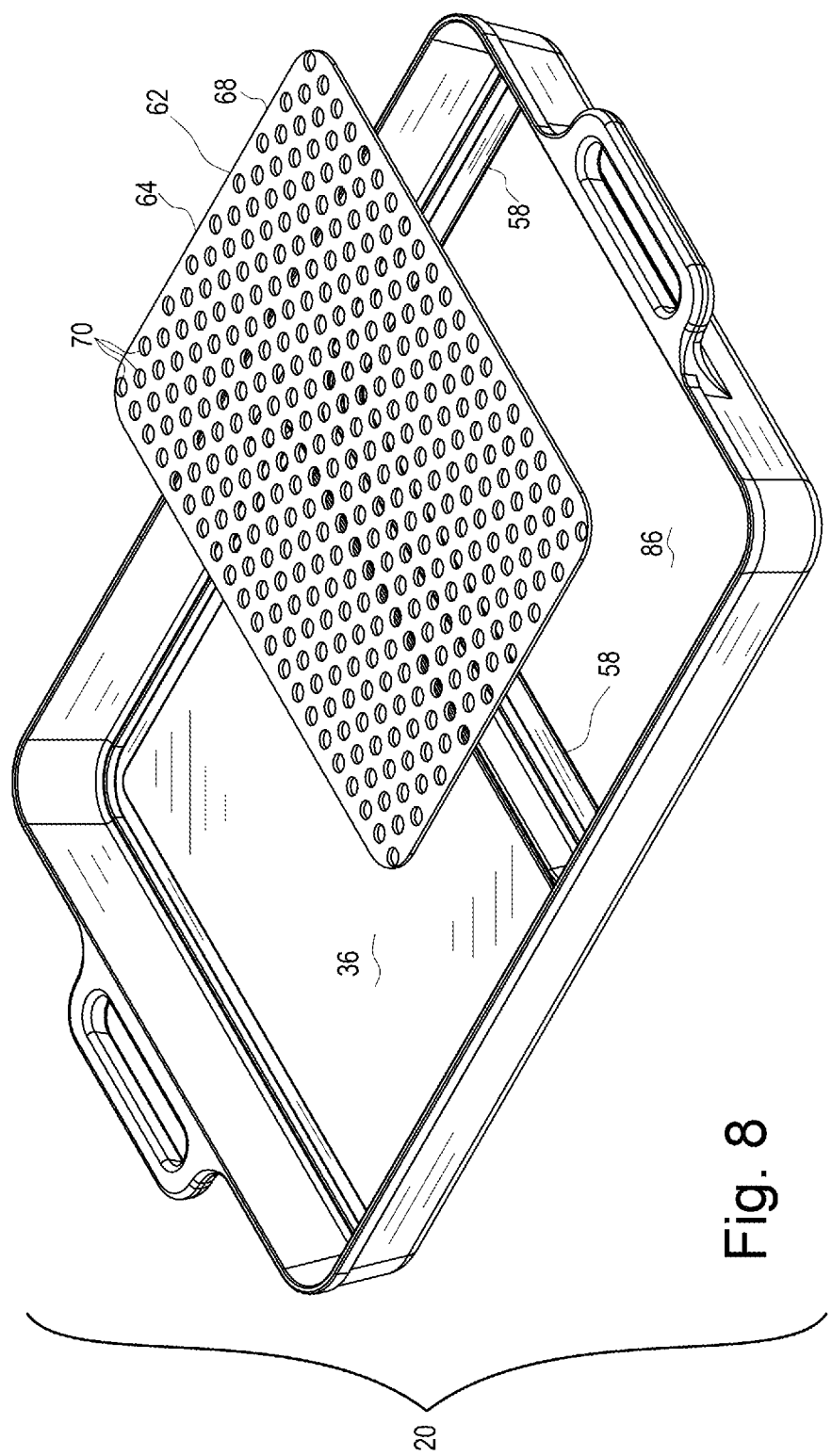
FIG. 8 is an isometric view of the disclosed device with a perforated insert shown detached.
Figure 9:
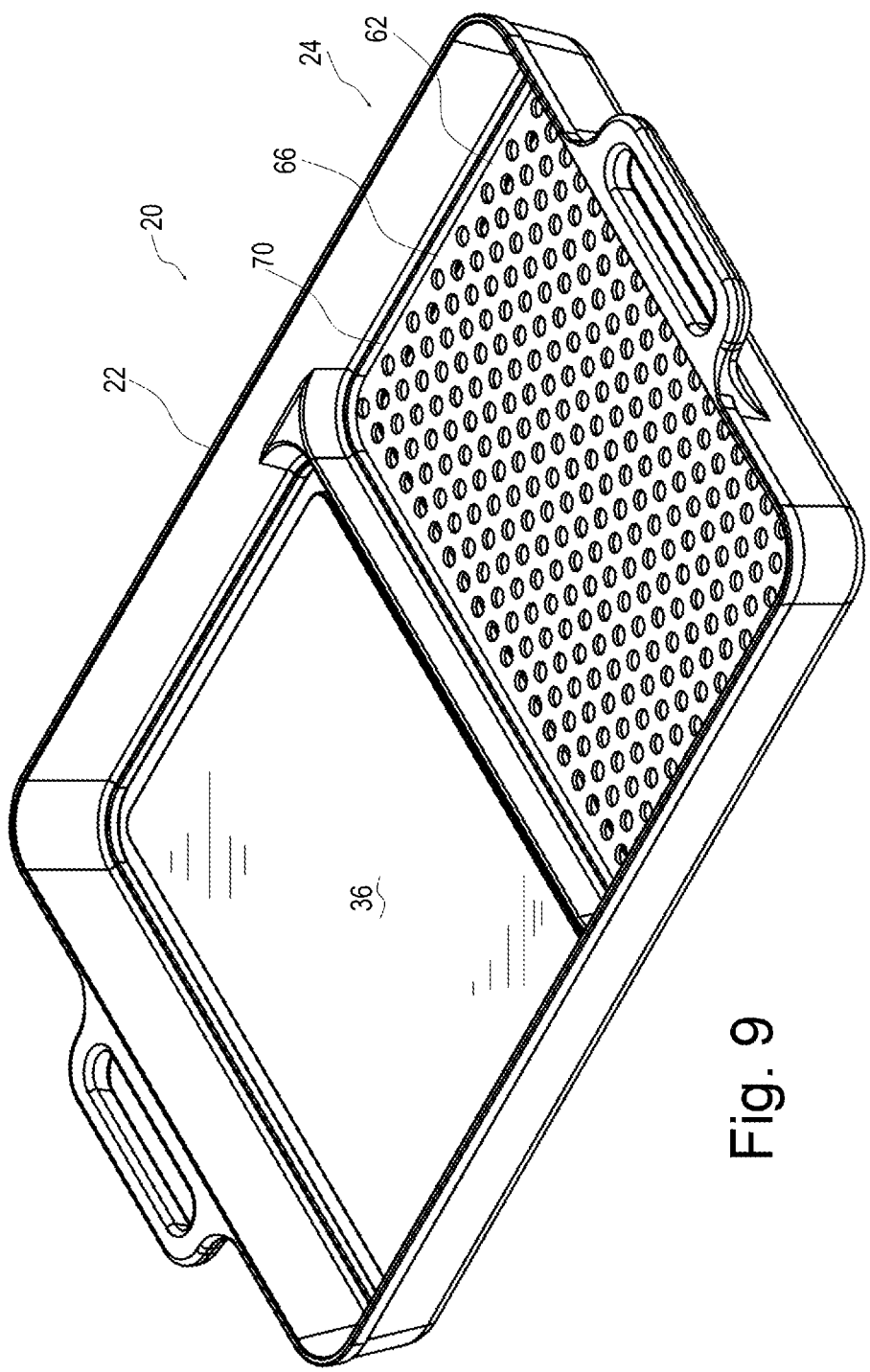
FIG. 9 is an isometric view thereof with the insert of FIG. 8 with the perforated insert in an operable position.
Figure 10:
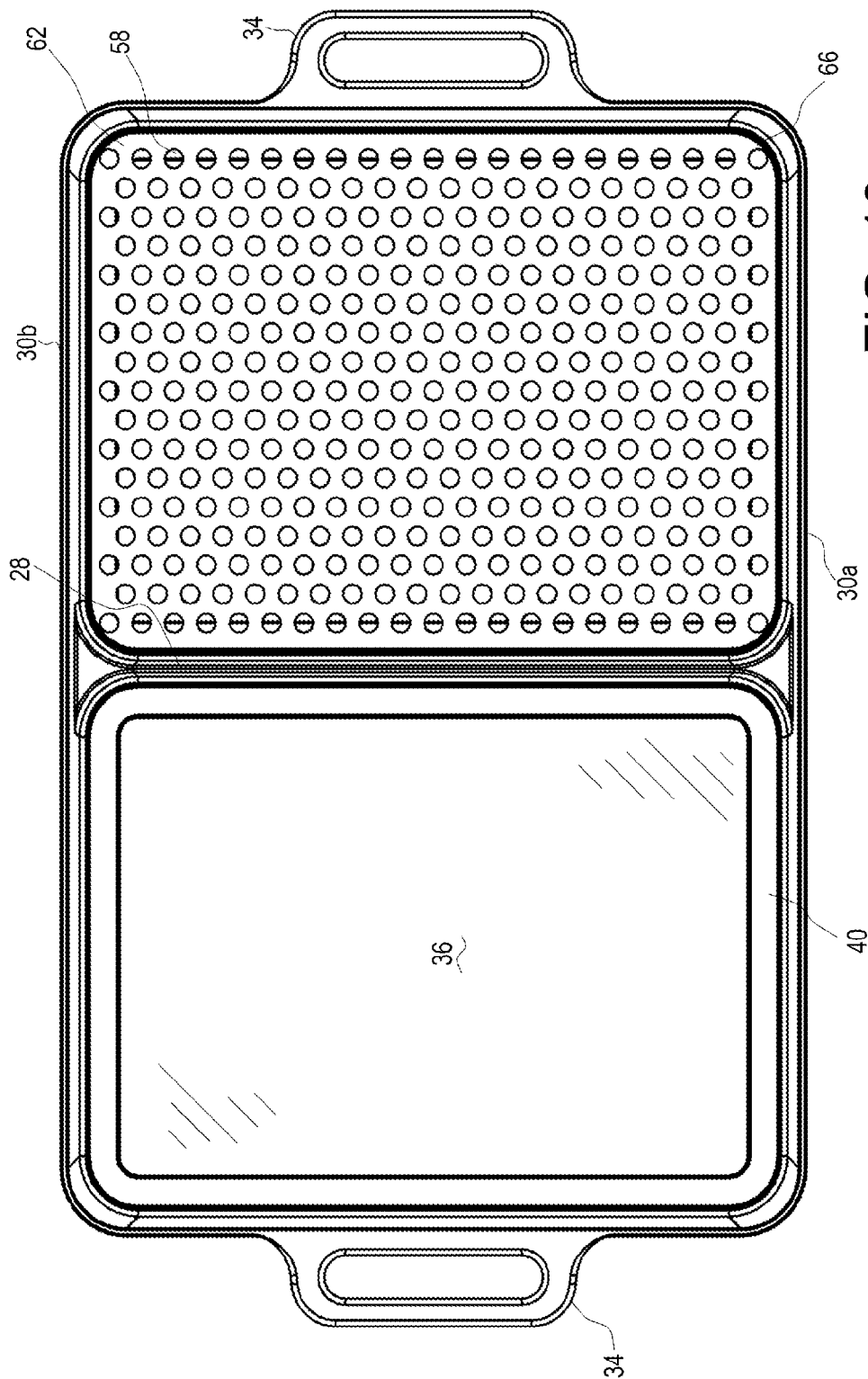
FIG. 10 is a top view thereof.

The grill portion 24 is not substantially useful without at least one insert to provide a cooking surface thereupon. Looking to FIG. 8, a perforated plate insert 62 is provided comprising a perimeter edge 64 having smaller width and length dimensions than the interior width and length dimensions between opposing vertical surfaces 66 adjacent the insert shelf 58. This example of a perforated plate insert 62 comprises a rigid plate 68 having sufficient rigidity to span the gap between opposing portions of the insert shelf 58 while food is being cooked thereupon. The plate 68 in this example comprises a plurality of perforations 7 be there through to allow fluids to pass there through and to increase thermal conductivity between the heat source and the food placed upon the plate 68. Looking to FIG. 9, it can be seen how the insert 62 has been fitted into the grill portion 24 of the modular griddle and grill frame with inserts 20. Due to thermal expansion differences between the construction or material of the frame portion 22 and the insert 62, it may be desired to leave a gap 70 between the insert 62 and the vertical surfaces 66 adjacent the insert shelf 58. While this may allow a slight repositioning of the insert 62 upon the insert shelf 58, such movement would not be significant and could be easily overcome. Support rails, corrugations, or other structures may be incorporated to increase the rigidity of the perforated plate 68.

Figure 11:
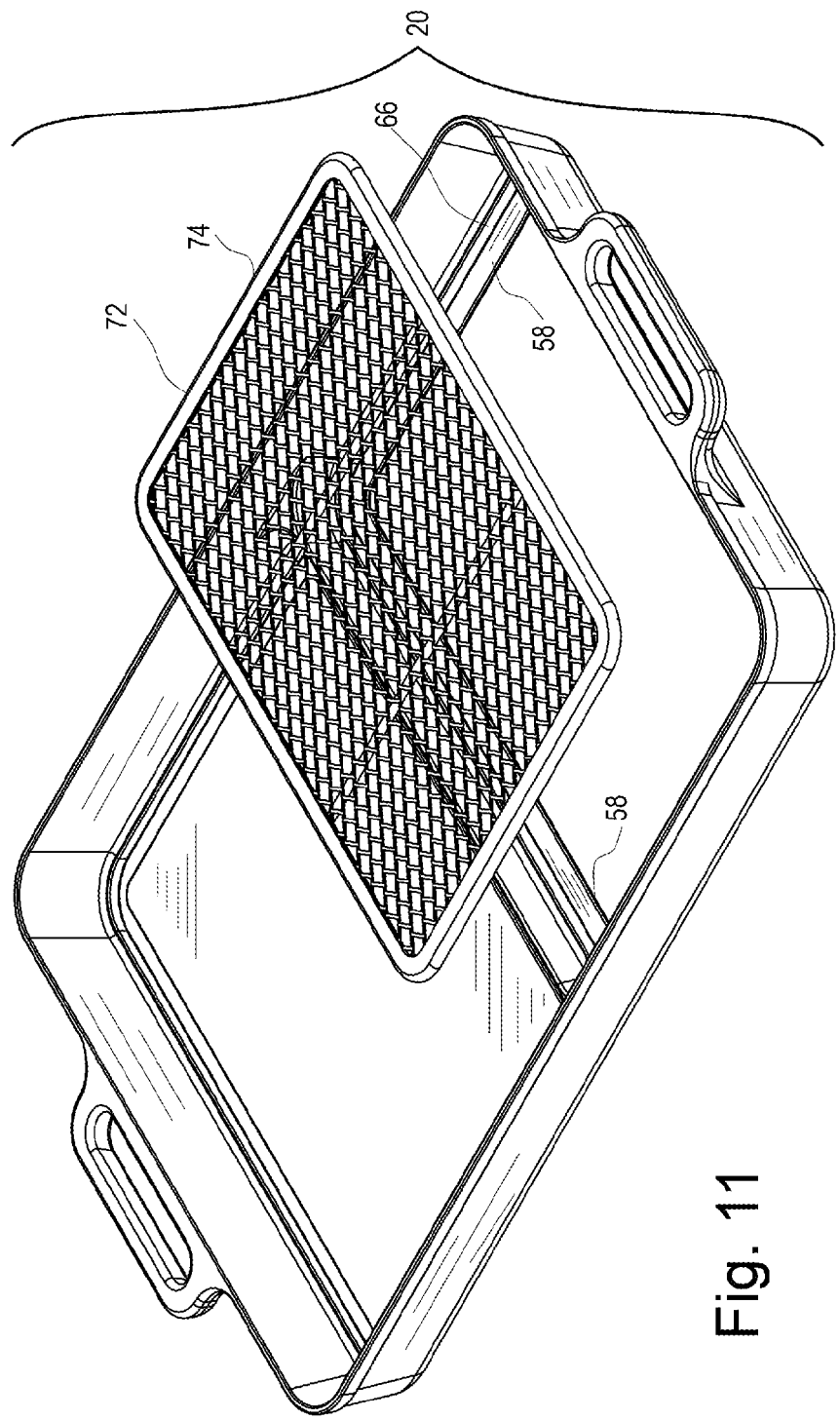
FIG. 11 is an isometric view of the disclosed device with a mesh insert shown detached.
Figure 12:
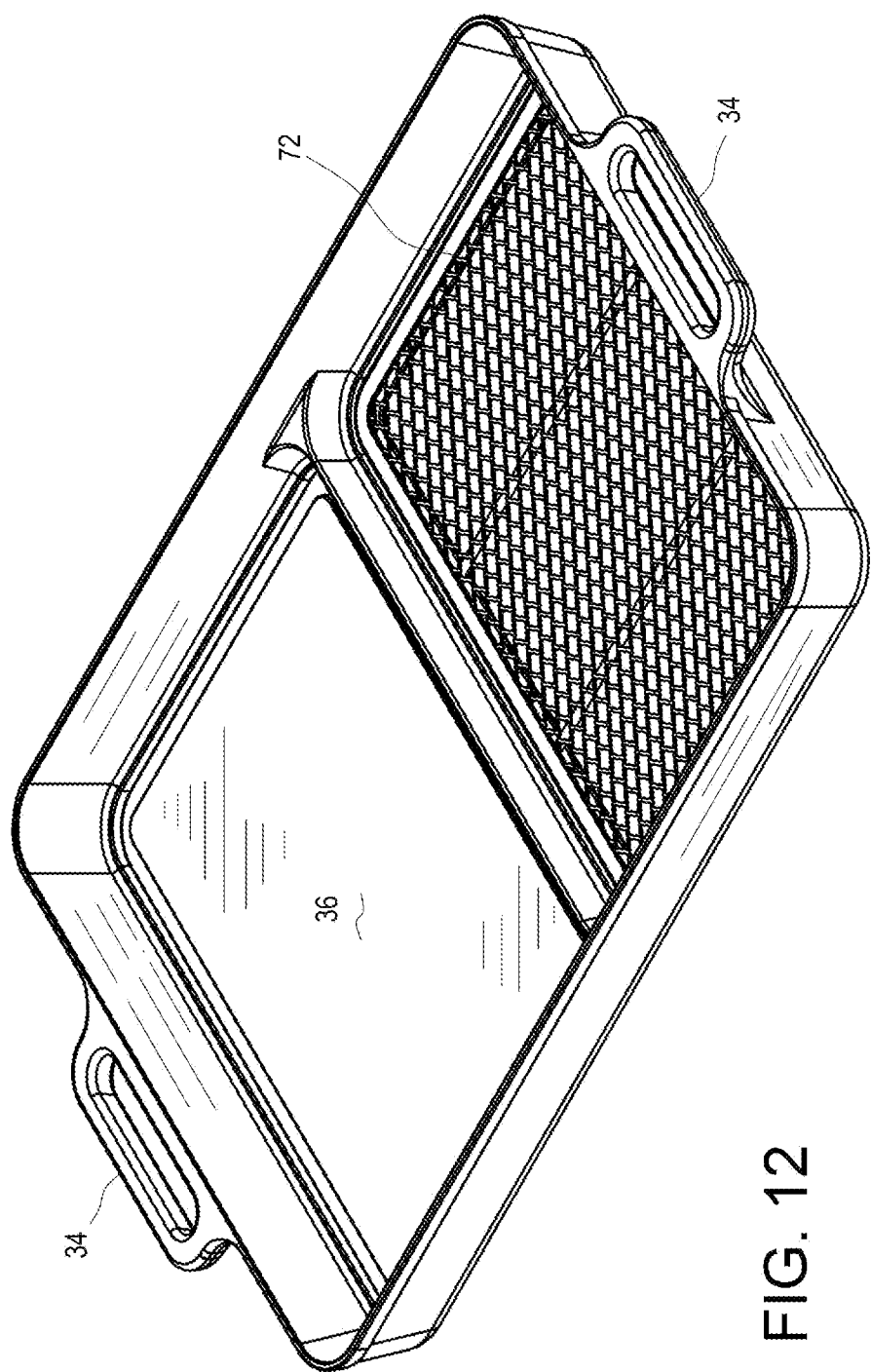
FIG. 12 is an isometric view thereof with the insert of FIG. 11 with the mesh insert in an operable position.
Figure 13:
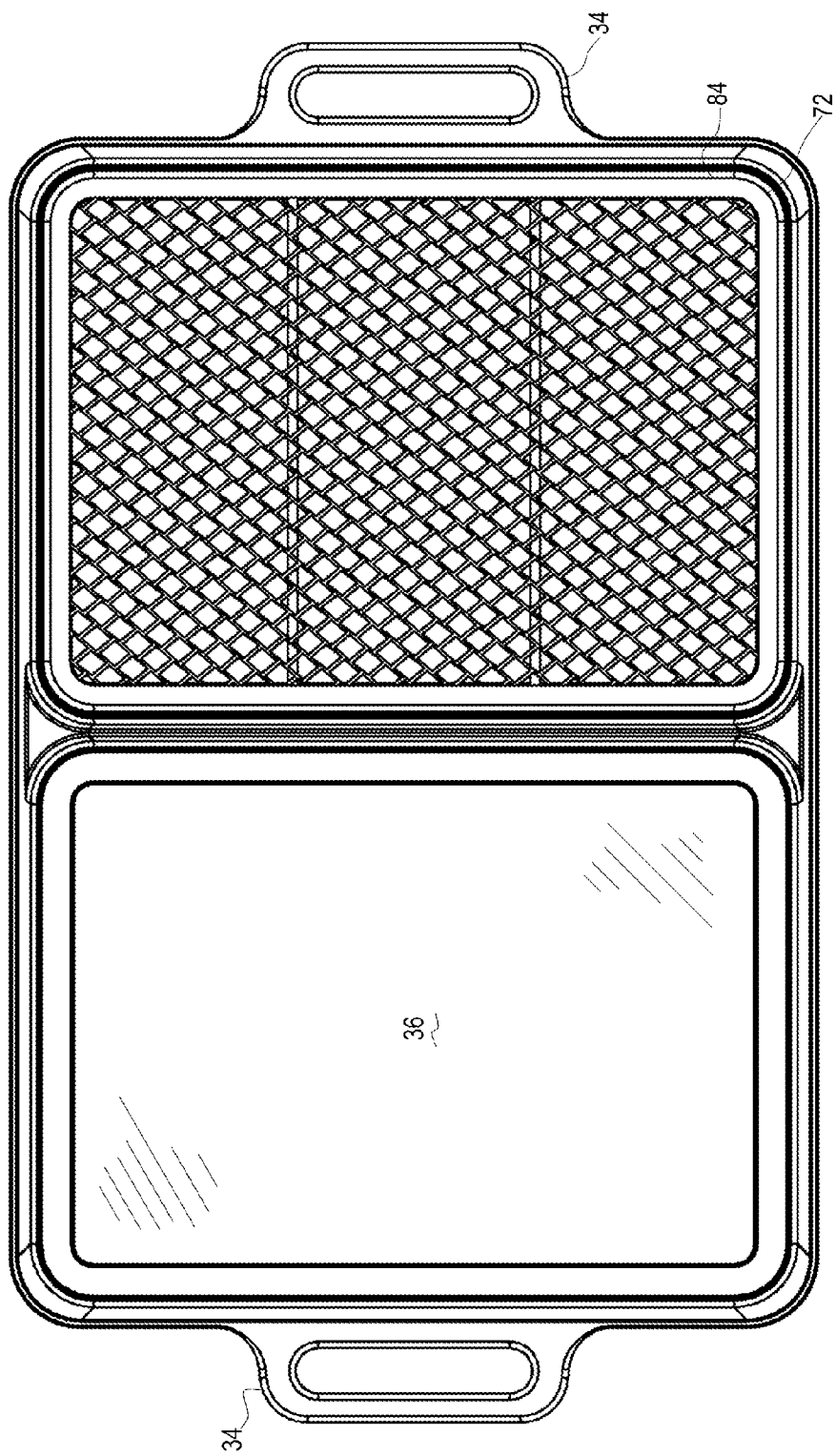
FIG. 13 is a top view thereof.
Figure 14:
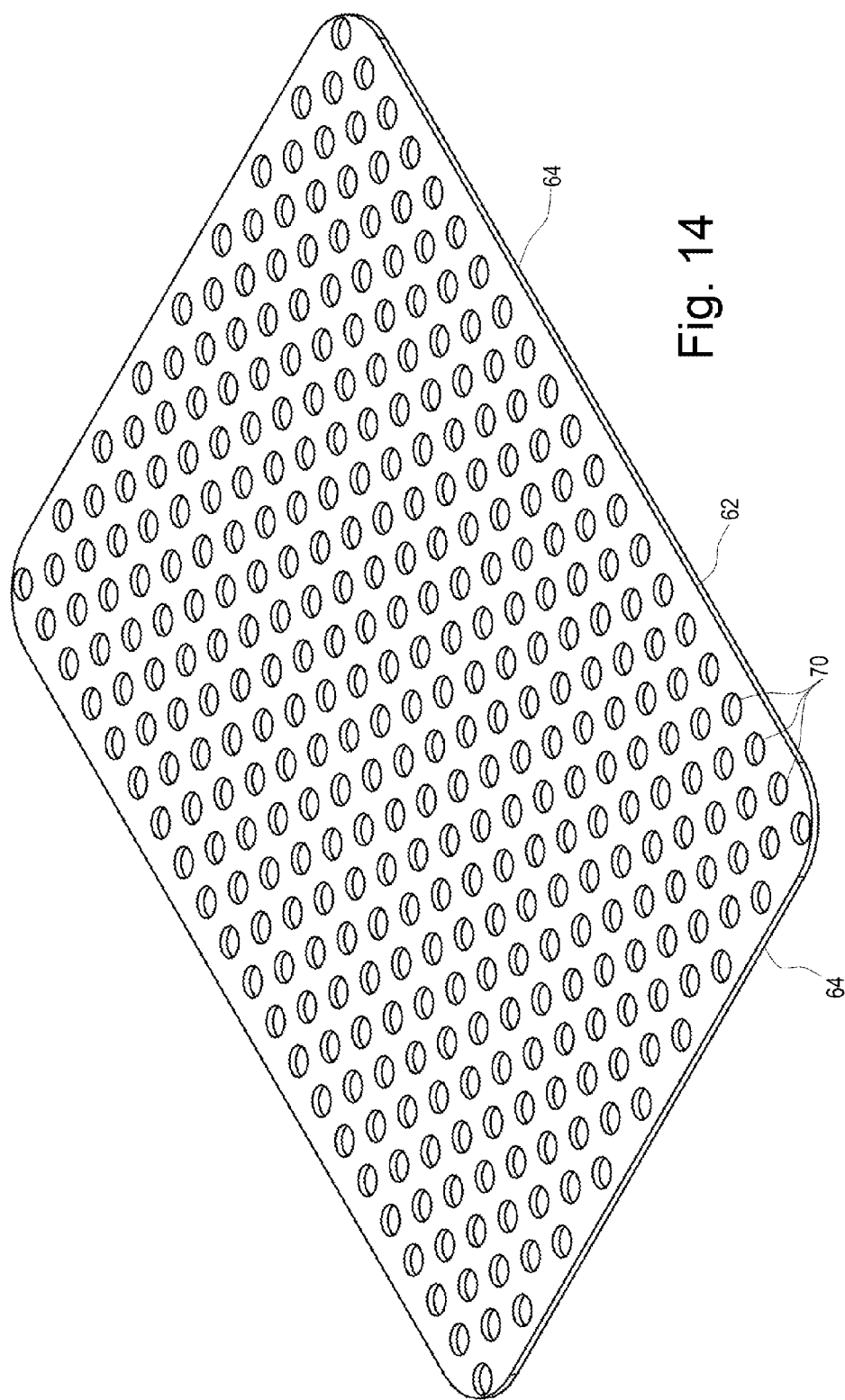
FIG. 14 is an isometric view of the perforated insert.

Looking to FIG. 11, a mesh insert 72 is provided comprising a perimeter edge 74 also having smaller width and length dimensions than the interior width and length dimensions between opposing vertical surfaces 66 adjacent the insert shelf 58. This example of a mesh insert 72 comprises several interoperating components as shown in FIG. 17. Also, it is conceived as a single mesh component similar to that of element 76 of FIG. 17 may have sufficient rigidity to span the gap between opposing sides of the insert shelf 58.

FIG. 17 shows one example of the mesh insert 72 and a perimeter edge 74 wherein the mesh insert 72 comprises several interoperating components to add aesthetic value, rigidity, and aid in cleaning of the insert 72. While several different combinations are possible, the insert 72 shown in FIG. 17 comprises an upper grill perimeter frame 78 fitted above a heat resistant mesh 76 and both of these elements may be fitted above a lower grill frame 80 which may have cross frames 82 welded or otherwise attached thereto. In one form, once in place the upper grill perimeter frame 78 is crimped around the edges of the heat resistant mesh 76 and lower grill frame 80. In this example, the lower grill frame 80 is substantially cylindrical in cross section including the cross frames 82. As previously defined relative to the perforated plate insert 62, a gap 84 may be provided between the perimeter edge 74 of the insert 72 and the vertical surfaces 66 of the frame portion 22.

As the mesh insert 72 would likely have very little thermal expansion, the gap 84 may not be necessary.

One additional benefit of this apparatus is that the grilling surfaces (grate) of barbecue grills etc. often need to be replaced due to wear, heat abuse, and oxidation enhanced by heat and food particles retaining moisture. With this disclosed apparatus, it is a relatively simple method and apparatus to replace the insert of the grill portion 24 at will as it is relatively small. As the apparatus 20 can be utilized on barbecue grills of many different sizes, shapes and configurations, this may significantly reduce or eliminate the need to replace the BBQ grate. Specifically, where a barbecue grill may be out dated, use of the disclosed apparatus 20 can allow a user to cook upon a clean and substantially undamaged surface.

Additionally, due to the ease of removal and reduced size of the grill portion 22, it may be convenient for the user to remove the insert and clean it using a dishwasher or equivalent apparatus where this is substantially not possible with most barbecue grill surfaces.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

We claim:

1. A combination griddle and modular grilling frame comprising:
   the grilling frame being thermally conductive and having a longitudinal dimension defined by first and second laterally opposed side walls, a transverse dimension defined by longitudinally opposed first and second end walls, and a lowermost portion forming a perimeter foot;
   a transverse divider extending between the side walls dividing the grilling frame into a first cooking region and a second separate longitudinally adjacent cooking region;
   a thermally conductive griddle surface forming the first cooking region, extending between the first longitudinal end wall, the transverse divider, the first side wall, and the second side wall;
   wherein the transverse divider extends vertically above the griddle surface
   a second cooking region bounded by the second longitudinal end wall, the transverse divider, and the first side wall and the second side wall;
   wherein the second cooking region comprises a surface defining an insert shelf, the insert shelf forming an edge of a hole through a bottom of the second cooking region;
   wherein the second cooking region includes opposing vertical surfaces surrounding and adjacent to the insert shelf to form a recess to support a cooking grate;
   the cooking grate removably positioned on the insert shelf covering the second cooking region;
   wherein the transverse divider extends vertically above the griddle surface and the cooking grate; and
   wherein the upper surface of the cooking grate is at the same vertical level with, and laterally adjacent the upper surface of the griddle surface.

2. The combination griddle and grilling frame as recited in claim 1 wherein the cooking grate comprises a perforated plate cooking surface fitted within and removably resting upon the insert shelf laterally adjacent the griddle surface.

3. The combination griddle and grilling frame as recited in claim 1 further wherein the cooking grate comprises a mesh insert cooking surface fitted within and removably resting upon the insert shelf laterally adjacent the griddle surface.

4. The combination griddle and grilling frame as recited in claim 3 wherein the mesh insert cooking surface comprises:
   upper a mesh insert perimeter frame;
   a heat resistant mesh extending across and in contact with the upper mesh insert perimeter frame; and
   a lower mesh insert perimeter frame attached to the upper grill frame and in contact with the perimeter of the heat resistant mesh.

5. The combination griddle and grilling frame as recited in claim 1 wherein the combination griddle and grilling frame is cast as a single body.

6. The combination griddle and grilling frame as recited in claim 5 wherein the combination griddle and grilling frame is cast of iron.

7. The combination griddle and grilling frame as recited in claim 1 further comprising a grease channel vertically below an upper surface of the griddle surface, longitudinally between the griddle surface and the end wall, laterally between the griddle surface and each side wall, and longitudinally between the griddle surface and the transverse divider.

8. The combination griddle and grilling frame as recited in claim 1 further comprising horizontally opposed lifting handles.

* * * * *